US010412070B2

(12) United States Patent
McNeely et al.

(10) Patent No.: US 10,412,070 B2
(45) Date of Patent: Sep. 10, 2019

(54) METHOD AND APPARATUS OF IMPLEMENTING A VPN TUNNEL

(71) Applicant: NOA, Inc., Miami Beach, FL (US)

(72) Inventors: Mark McNeely, Miami, FL (US); Michael McNeely, Miami, FL (US)

(73) Assignee: NOA, Inc., Miami Beach, FL (US)

( * ) Notice: Subject to any disclaimer, the term of this patent is extended or adjusted under 35 U.S.C. 154(b) by 146 days.

(21) Appl. No.: 15/629,267

(22) Filed: Jun. 21, 2017

(65) Prior Publication Data
US 2017/0366529 A1    Dec. 21, 2017

Related U.S. Application Data

(60) Provisional application No. 62/352,759, filed on Jun. 21, 2016.

(51) Int. Cl.
*H04L 29/06* (2006.01)
*H04W 12/06* (2009.01)
*H04W 12/00* (2009.01)

(52) U.S. Cl.
CPC .......... *H04L 63/08* (2013.01); *H04L 63/0272* (2013.01); *H04L 63/0853* (2013.01);
(Continued)

(58) Field of Classification Search
CPC ... H04L 63/00; H04L 63/0272; H04L 63/029; H04L 63/08; H04L 63/0823;
(Continued)

(56) References Cited

U.S. PATENT DOCUMENTS

2006/0036854 A1* 2/2006 Liu ..................... H04L 63/0272
713/165
2006/0253894 A1* 11/2006 Bookman ............... H04L 63/08
726/2

(Continued)

OTHER PUBLICATIONS

International Search Report issued in connection with International Patent Application No. PCT/US17/38526 dated Sep. 13, 2017.
(Continued)

*Primary Examiner* — Eric W Shepperd
(74) *Attorney, Agent, or Firm* — Edwards Neils LLC; Jean C. Edwards, Esq.

(57) ABSTRACT

The present invention is directed to allowing a more secure initial, and continuous authentication of virtual private network (VPN) tunneling. The device of the present invention contains its own microprocessor and operating system which connects to the host system via a universal serial bus (USB) or another coupling mode. The present invention involves executing and storing of the VPN software, certificates, credentials and sensors on the device, which allows for more security and manageability as opposed to executing the VPN on the host system. The device continuously authenticates the presence of the user via biometrics or the presence of second device, including a smartphone, a smartwatch, an NFC ring or a custom device with a microprocessor, via Quick Response (QR) Codes, Near-Field Communication (NFC) or Bluetooth Low Energy (LE) proximity authentication to activate or deactivate the VPN tunnel.

30 Claims, 3 Drawing Sheets

(52) U.S. Cl.
CPC ...... *H04L 63/0861* (2013.01); *H04L 63/0876* (2013.01); *H04W 12/00522* (2019.01); *H04W 12/06* (2013.01)

(58) Field of Classification Search
CPC ............... H04L 63/083; H04L 63/0853; H04L 63/0861; H04L 63/0876; H04L 63/0892; H04W 12/06
See application file for complete search history.

(56) References Cited

U.S. PATENT DOCUMENTS

| | | | |
|---|---|---|---|
| 2007/0056032 A1* | 3/2007 | Valenci | H04L 12/4641 726/15 |
| 2009/0319782 A1* | 12/2009 | Lee | G06F 21/34 713/156 |
| 2010/0083015 A1* | 4/2010 | Yokota | G06F 1/3209 713/310 |
| 2010/0161960 A1* | 6/2010 | Sadasivan | H04L 63/0272 713/152 |
| 2012/0102324 A1† | 4/2012 | Rodriguez | |
| 2012/0233674 A1* | 9/2012 | Gladstone | H04L 9/085 726/6 |
| 2013/0046976 A1* | 2/2013 | Rosati | H04L 63/0853 713/168 |
| 2013/0054271 A1* | 2/2013 | Langford | G06Q 50/24 705/3 |
| 2013/0091537 A1* | 4/2013 | Parla | G06F 21/00 726/1 |
| 2013/0268687 A1* | 10/2013 | Schrecker | H04W 12/06 709/229 |
| 2014/0020073 A1* | 1/2014 | Ronda | G06F 21/31 726/7 |
| 2014/0325224 A1* | 10/2014 | Grube | G06F 17/30194 713/168 |
| 2015/0046192 A1* | 2/2015 | Raduchel | H04W 8/18 705/3 |
| 2015/0113273 A1† | 4/2015 | Rodriguez | |
| 2015/0188889 A1* | 7/2015 | Lawson | H04L 63/0272 726/15 |
| 2015/0312041 A1 | 10/2015 | Choi | |
| 2016/0125180 A1 | 5/2016 | Smith et al. | |

OTHER PUBLICATIONS

Written Opinion issued in connection with International Patent Application No. PCT/US17/38526 dated Sep. 13, 2017.

\* cited by examiner
† cited by third party

METHOD AND APPARATUS OF IMPLEMENTING A VPN TUNNEL

CROSS-REFERENCE TO RELATED APPLICATIONS

The present invention claims priority from U.S. Provisional Patent Application No. 62/352,759, filed Jun. 21, 2016, the contents of which are herein incorporated by reference in their entirety.

BACKGROUND OF THE INVENTION

1. Field of the Invention

The present invention is directed to allowing a more secure initial, and continuous authentication of virtual private network (VPN) tunneling. The device of the present invention contains its own microprocessor and operating system which connects to the host system via a universal serial bus (USB). The present invention involves executing and storing of the VPN software, certificates, credentials and sensors on the device, which allows for more security and manageability as opposed to executing the VPN on the host system. The device can be configured for Login, Quick Response (QR) Codes, Near-Field Communication (NFC) or Bluetooth Low Energy (LE) proximity authentication to activate or deactivate the VPN tunnel.

2. Description of the Related Art

A VPN system allows users to send/receive data across shared or public networks, over the internet, as if their computers were directly connected to a private network. The VPN tunnel is a secure, encrypted connection, between the user's client computer and computers and/or servers operated by the VPN service.

Traditional VPN tunnels (i.e., Internet Protocol Security Standards, such as RFC2547, and RFC4364) require software, certificate and password information to be installed on the personal computer (PC) (i.e., desktop, laptop, etc.) of the user. However, this approach has the risk of the user's computer being hacked since all the information is stored there. Another risk is if the user's computer is stolen with the certificates and passwords on the computer itself, then this would leave the network behind the VPN server vulnerable until the certificates were revoked.

In other concerns, once the user logs into the personal, client computer, the VPN tunnel can be opened automatically or by the user logging in with the tunnel application. However, once the user walks away from the computer, the tunnel is still open with the computer unlocked, and anyone can walk up to the computer and access the VPN network. Another scenario of concern is where the user locks the computer and someone uses a remote desktop platform (RDP) into the computer to access the tunnel.

Specifically, in a traditional, installed VPN client computer, the certificates, passwords, and endpoint information are stored in software on the operating system (OS) drive. The OS drive is installed on the user's client computer, and the VPN tunnel accesses the internet via the network information center (NIC). The Internet Protocol Suite (TCP/IP) application accesses the VPN tunnel by IP or hostname, but first accesses the VPN software, and the TCP/IP application accessing the internet by IP or hostname, proceeds via a default gateway to the NIC before reaching the internet. These certificates, passwords, and endpoint information are vulnerable if the desktop or laptop is stolen or hacked.

Thus, a way of securing the VPN tunnel and the certificates, passwords, and endpoint information in software on the OS drive on the client computer, is desired.

SUMMARY OF THE INVENTION

The present invention is directed to allowing a more secure initial, and continuous authentication of virtual private network (VPN) tunneling. The controller of the present invention contains its own microprocessor and operating system which connects to the host system via a universal serial bus (USB) or via another mode of securing coupling. The present invention involves executing and storing of the VPN software, certificates, credentials and sensors on the device, which allows for more security and manageability as opposed to executing the VPN on the host system. The controller device can be configured for primary and continuous authentication of the presence of the user via biometrics or interactivity with the user, or for primary and continuous authentication by a second trusted device, such as a smartphone, smartwatch, nearfield communication (NFC) ring, or custom device, which continuous authentication uses Quick Response (QR) Codes, Near-Field Communication (NFC) or Bluetooth Low Energy (LE) proximity authentication. The controller activates the VPN tunnel upon primary authentication and deactivates the VPN tunnel when continuous authentication fails.

In one embodiment, a virtual private network (VPN) tunnel system includes: a controller which is coupled to a client computer, the controller including a microprocessor containing at least one memory, the memory containing an operating system program; wherein the memory stores authentication information including certificate, password and endpoint information in the controller instead of in a database of the client computer; and wherein when the authentication information received by the client computer is validated by the controller, the microprocessor executes the operating system program of the controller to implement at least one VPN tunnel which connects the client computer to a VPN server and to a private network of computers and servers, via an internet connection.

In one embodiment, the primary and continuous authentication of the controller is performed by at least one of periodic input of biometrics of a user, or communications with a secondary device via at least one contactless communication system.

In one embodiment, the controller is disposed in a universal serial bus (USB) VPN device.

In one embodiment, the contactless communication system includes one of Bluetooth Low Energy (LE), Near-Field Communication (NFC), or Quick Response (QR) Code In one embodiment, the VPN tunnel is deactivated immediately when one of inactivity over a predetermined period of time occurs at the client computer, incorrect biometrics are received at the client computer, uncoupling of the controller from the client computer occurs, or lack of proximity of the secondary device from the client computer occurs.

In one embodiment, the controller automatically deactivates upon intrusion detection and deletes all secured data in the memory.

In one embodiment, the secondary device includes one of a portable or wearable device, including one of a smartphone, a smartwatch, an NFC ring, or a custom device with a microprocessor.

In one embodiment, the memory stores encryption private keys.

In one embodiment, the secondary device is equipped with wireless capability; wherein the secondary device emits a signal to the controller using the wireless capability, in order to activate the VPN tunnel once the controller is coupled to the client computer.

In one embodiment, an authentication applet is preinstalled on the secondary device; and wherein a password is received in the secondary device upon an authentication request, and the signal is transmitted to the controller, which returns an authentication token to the secondary device; and wherein once the authentication token is received from the controller and is valid, and when the operating system program is configured for remote authentication, the authentication token is forwarded by the secondary device to an authentication server for authorization.

In one embodiment, the VPN tunnel remains activated for as long as the secondary device is sending the signal to the controller, and the secondary device is within a predetermined range from the client computer; and wherein when the secondary device is out of range of the controller, the VPN tunnel is terminated.

In one embodiment, the predetermined range is determined using Received Signal Strength Indication (RSSI) with one of Bluetooth LE, or a limited range of NFC.

In one embodiment, the system further includes: a status indicator disposed on the USB VPN device, which indicates at least one of a connected status or a security status of the USB VPN device.

In one embodiment, the USB VPN device further includes an optical sensor to read Quick Response (QR) codes for authentication.

In one embodiment, a method of implementing a virtual private network (VPN) tunnel system, includes: coupling a controller to a client computer; wherein the controller includes a microprocessor containing at least one memory which contains an operating system program; wherein the memory stores certificate, password and endpoint information in the controller instead of in a database of the client computer; and receiving authentication information at the client computer; validating said authentication information using the controller; and executing the operating system program of the controller to implement at least one VPN tunnel which connects the client computer to a VPN server and to a private network of computers and servers, via an internet connection.

In one embodiment, the method further includes: performing primary and continuous authentication of the controller is performed by at least one of periodic input of biometrics of a user, or communications with a secondary device via at least one contactless communication system.

In one embodiment, the method further includes: deactivating the VPN tunnel immediately when one of inactivity over a period of time occurs at the client computer, incorrect biometrics are received at the client computer, uncoupling of the controller from the client computer occurs, or lack of proximity of the secondary device from the client computer occurs.

In one embodiment, the method further includes: deactivating the controller automatically upon intrusion detection and deleting all secured data in the memory.

In one embodiment, the method further includes: emitting a signal to the controller using wireless capability of the secondary device, in order to activate the VPN tunnel once the controller is coupled to the client computer.

In one embodiment, the method further includes: preinstalling an authentication applet on the secondary device; and receiving a password in the secondary device upon an authentication request, and transmitting the signal to the controller; returning an authentication token to the secondary device; validating the authentication token; and forwarding the authentication token to an authentication server for authorization when the operating system program is configured for remote authentication.

Thus, has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DESCRIPTION OF THE INVENTION

The present invention is directed to allowing a more secure initial, and continuous authentication of virtual private network (VPN) tunneling. The controller of the present invention contains its own microprocessor and operating system which connects to the host system via a universal serial bus (USB) or via another mode of securing coupling. The present invention involves executing and storing of the VPN software, certificates, credentials and sensors on the device, which allows for more security and manageability as opposed to executing the VPN on the host system. The controller device can be configured for primary and continuous authentication of the presence of the user via biometrics or interactivity with the user, or for primary and continuous authentication by a second trusted device, such as a smartphone, smartwatch, nearfield communication (NFC) ring, or custom device, which continuous authentication uses Quick Response (QR) Codes, Near-Field Communication (NFC) or Bluetooth Low Energy (LE) proximity authentication. The controller activates the VPN tunnel upon primary authentication and deactivates the VPN tunnel when continuous authentication fails.

Figure 1:
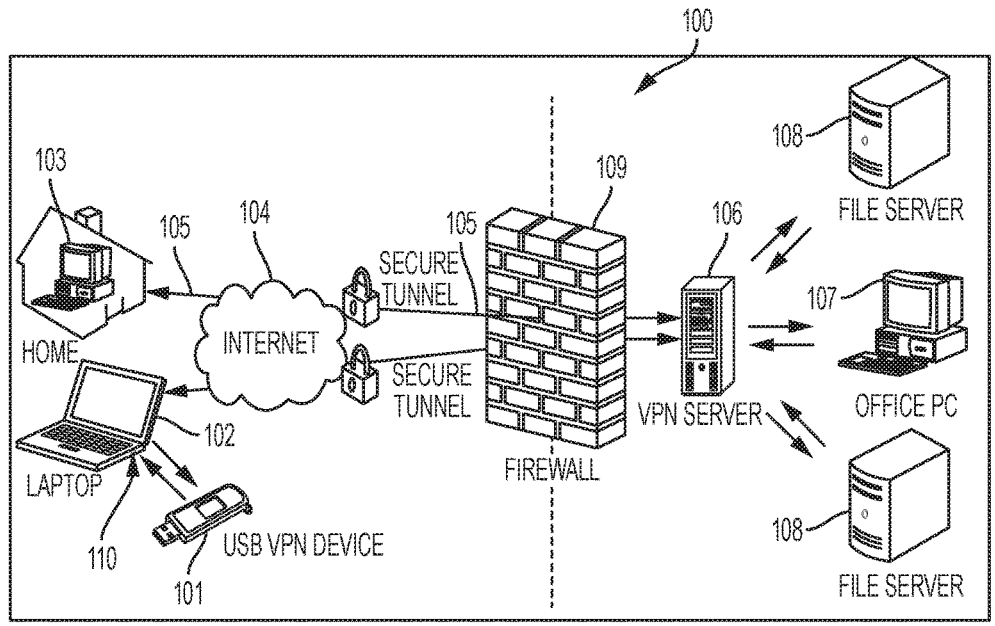
FIG. 1 is a schematic diagram of a VPN tunnel system according to one embodiment consistent with the present invention.

In one embodiment, the VPN tunnel system 100 of the present invention (see FIG. 1) includes VPN tunnels 105 (i.e., Internet Protocol Security Standards, such as RFC2547, and RFC4364) which connect a user's client computer (i.e., laptop 102 or desktop 103) via the internet 104 to a VPN server 106, and a private network (i.e., computer(s) 107, and server(s) 108).

In order to prevent security issues with the certificate, password and endpoint information, being normally held in the databases of the memory installed on the operating system (OS) of the personal computer (PC) 102, 102, the present invention provides a universal serial bus (USB) VPN device 101, which includes the operating system (OS) software program which runs on the device 101, rather than on the user's computer 102, 103.

Since the certificates, passwords and endpoint information are installed on the USB device 101 rather than on the computer 102, 103, and all that is needed on the computer 102, 103 is an internet protocol (IP) and a route 202 (see FIG. 2) from Internet Protocol Suite (TCP/IP) application 203 (accessing the VPN tunnel 204 by IP or hostname) to the VPN USB device 201, which can be set using driver setup or net, ipconfig and route commands. All the VPN tunnel data passes into the USB VPN device 101 via the USB connector/port 110 then is routed back out the USB VPN tunnel device 101 through the same USB connector/port 110.

Figure 2:
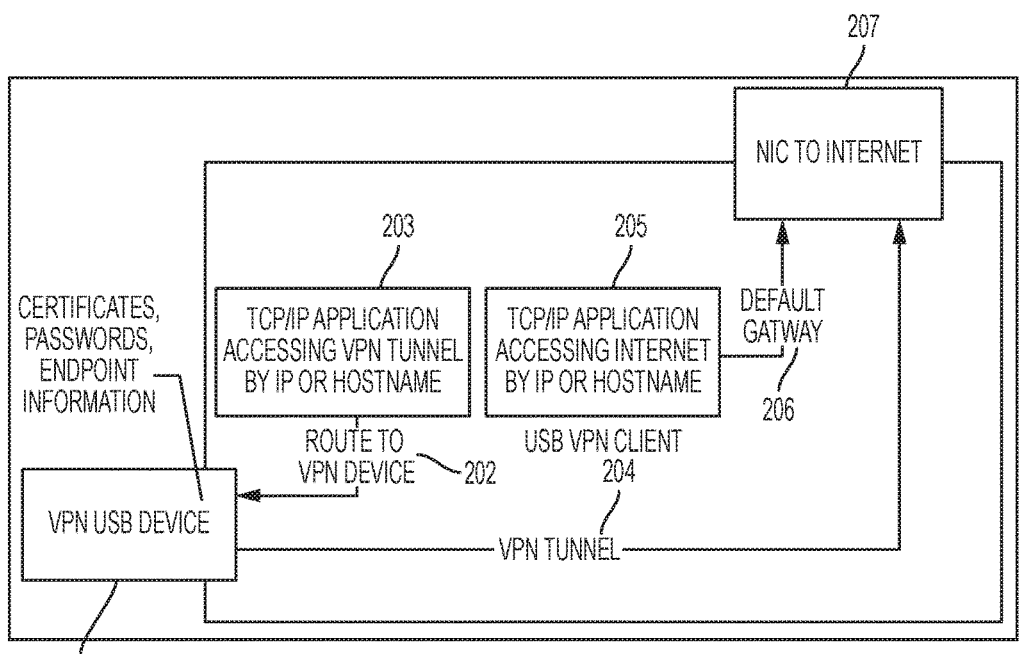
FIG. 2 is a schematic diagram of the installed VPN client of the VPN tunnel system of FIG. 1, showing where the certificates, passwords, and endpoint information are held, according to one embodiment consistent with the present invention.

As shown in FIG. 2, the TCI/IP application 205 accessing the internet does so via the default gateway 206 to the network information center (NIC) 207. Accordingly, the certificates, passwords, and endpoint information are no longer vulnerable if the client computer 102, 103 is stolen or hacked.

Once the USB VPN device 101 is plugged into the USB port 110 of the client computer 102, 103, and powered up, the USB VPN device tunnel 105, 204 would be in the non-connected state. In one embodiment, primary and continuous authentication of the USB VPN device 101 can be performed by one or more of web Login, biometrics, wireless (i.e., Bluetooth LE, NFC), or Quick Response (QR) Code (described further below). All Login, NFC, Bluetooth LE, Biometrics, or QR Codes are encrypted using well established standards.

In one embodiment, once authentication is achieved, the VPN tunnel 105, 204 would start the protocol negotiation and changes to the connected state, if the software program determines that the device certificates and endpoint certificates match.

In one embodiment, the VPN tunnel 105, 204 is easy to open/close by simply inserting the USB VPN device 101 into the port 110 of the client computer 102, 103, and when the USB VPN device 101 is not desired to be in use, the USB VPN device 101 can be removed from the port 110 of the client computer 102, 103, and since the VPN tunnel 105, 204 runs on the operating system installed on the USB VPN device 101, the VPN tunnel 105, 204 is instantly shutdown.

In one embodiment, the operating system software program which runs the VPN tunnel 105, 204, is installed, secured, and run on its own microprocessor within the USB VPN device 101. Thus, as stated above, other than driver and routing information, no other software needs to be installed on the client computer 102, 103, providing security of the certificates, password, and endpoint information.

In one embodiment, the controller of the USB VPN device 101 can be configured to different levels of security. Further, in one embodiment, upon intrusion detection (.e. hacking, etc.), the controller of the USB VPN device 101 can be configured to automatically deactivate and to delete all secured data in microprocessor memory.

Figure 4:
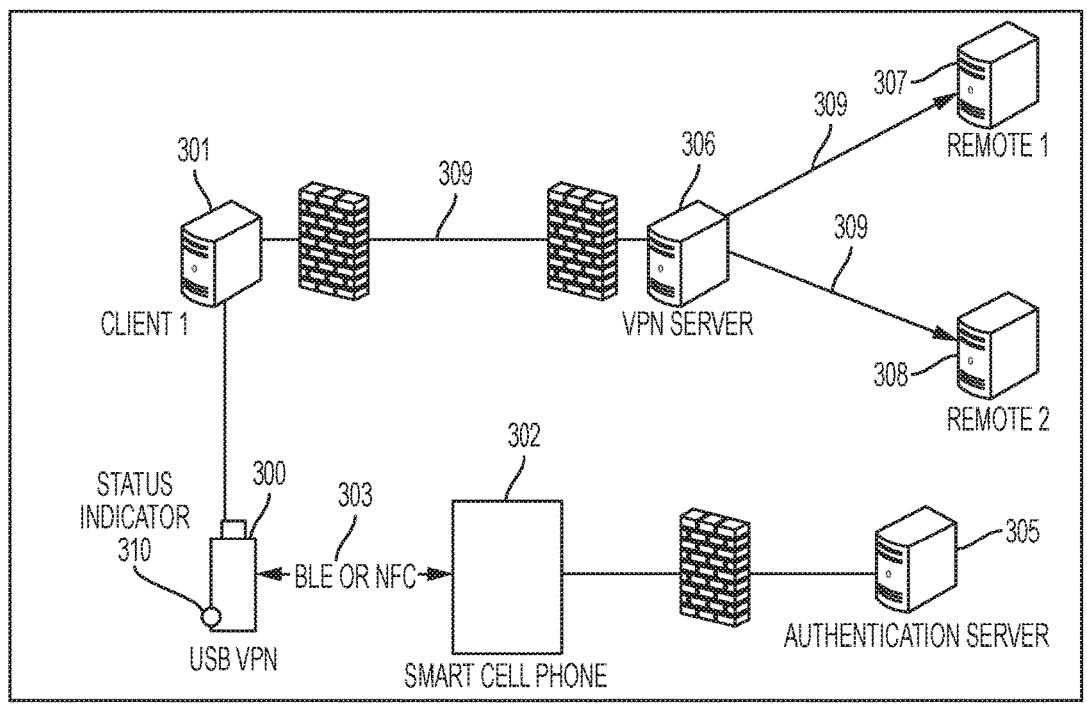
FIG. 4 is a schematic diagram showing the authentication process of the USB VPN device, according to one embodiment consistent with the present invention.

In one embodiment, status indicators 310 (see FIG. 4) are included such that the user or other personnel can determine the status of the USB VPN device 101 (i.e., on, off, security issue, etc.).

In one embodiment, encryption private keys are stored on the USB VPN device 101, and the USB VPN device 101 can connect to commonly used firewalls 109 or VPN servers 108.

In one embodiment, the user or information technology personnel can perform easy administration using onboard webserver protocol, which can be permanently deactivated once configuration is completed. As noted above, configuration parameters include NFC data, biometric data, authentication endpoints, VPN endpoints, certificates, etc. Thus, the USB VPN device 101 of the present invention is simple for users to understand and utilize.

Figure 3:
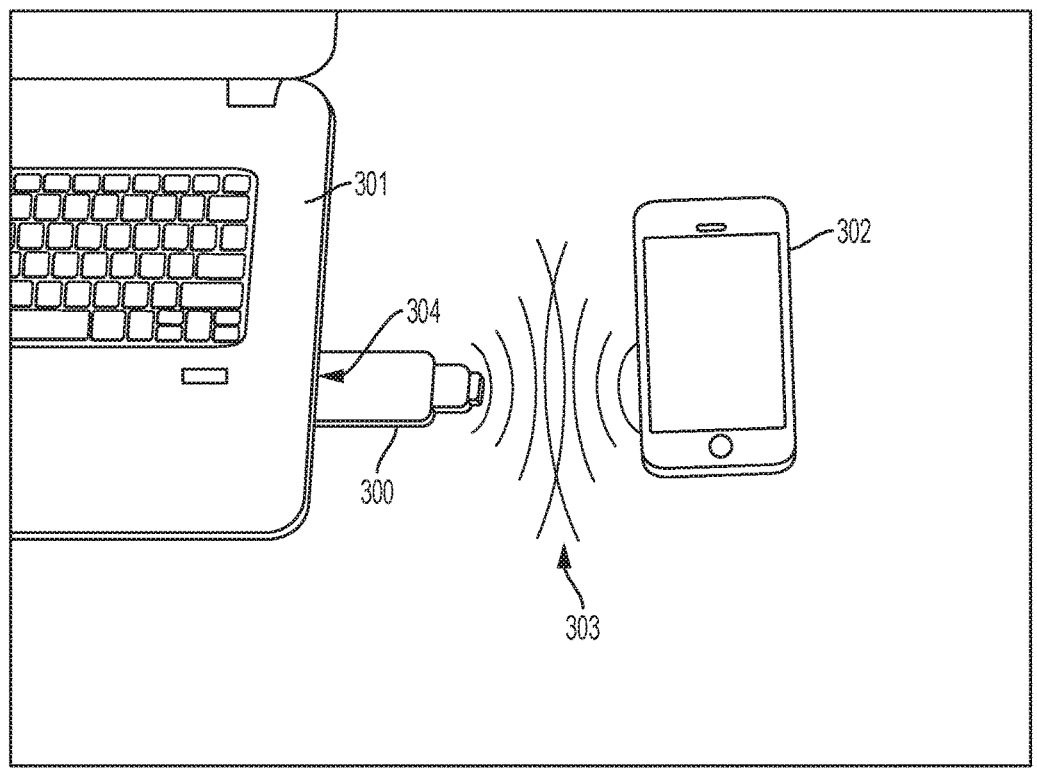
FIG. 3 is a schematic diagram showing the USB VPN device of the present invention installed in a computer USB port, and a smart phone which can be used with the USB VPN device, according to one embodiment consistent with the present invention.

In one embodiment, the method of implementing a VPN tunnel system, begins with the administrator/user plugging in the USB VPN device 300 (see FIG. 3) into the USB port 304 of the administrator's client computer 301.

In step 1), the administrator uploads the operating system (OS) stored on the USB VPN device 300 into the client computer 301.

In step 2), the administrator navigates to the administration URL on the client computer 301 screen.

In step 3), the administrator authenticates by biometrics, etc., into the onboard webserver of said client computer 301.

In step 4), if the authentication of said biometrics or other authentication information inputted into said client computer 301, is confirmed by said controller of said USB VPN device 300, the administrator enters the USB VPN device 300 information into the client computer 301.

In step 5), the administrator deactivates the onboard administration webserver. Once the onboard administration webserver is deactivated, the administrator uploads a new USB VPN device 300 operating system (OS) image and reconfigures the USB VPN device 300.

In step 6), the administrator implements the frequency and protocols of the continuous and periodic authentication required to compel proper authentication of the user or a category of users.

In this way, when the VPN tunnel 309 is activated in step 7), after proper authentication as above, the user must enter biometric or other authentication information, such as from a second trusted device (i.e., smartphone, smartwatch, nearfield communication (NFC) ring, or custom device), into the client computer 301, on a continuous and periodic basis, in order to keep the VPN tunnel 309 open. If this information is not provided or is faulty, or the controller notes inactivity of the user over a predetermined period of time, or lack of proximity of authentication (i.e., using Quick Response (QR) Codes, Near-Field Communication (NFC) or Bluetooth Low Energy (LE)), the controller will immediately deactivate the VPN tunnel 309.

In an optional step 7), the administrator can activate an onboard security system which deactivates the USB VPN device 300 if unauthorized access is detected (hacking), and the secure data thereon is deleted. Once tripped, the USB VPN device 300 would need to be re-imaged and configured.

Figure 5:
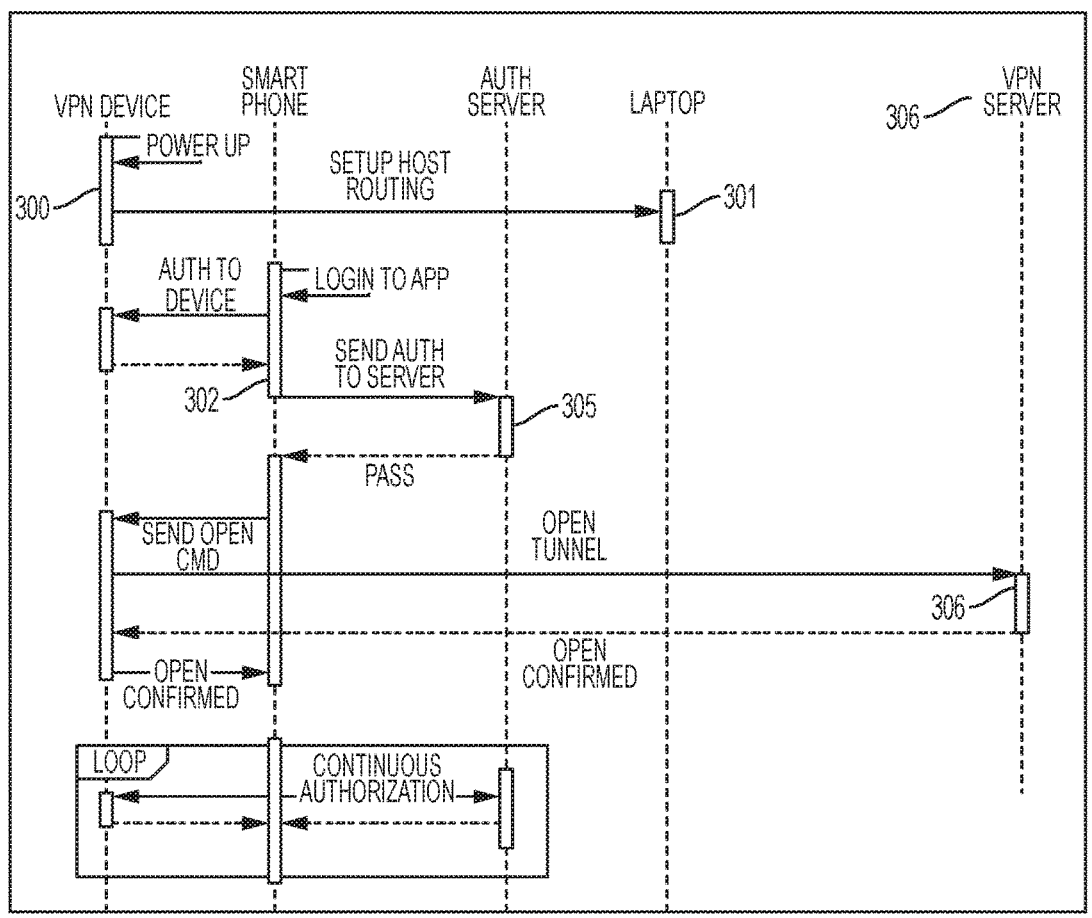
FIG. 5 is a schematic diagram showing the authentication process of FIG. 4, according to one embodiment consistent with the present invention.

In another embodiment consistent with the present invention, a contactless communication system is used to activate the VPN tunnel. In this exemplary embodiment, a Bluetooth LE or an NFC capable smartphone (cell phone) 302 sends a signal 303 to the USB VPN device 300, in order to activate the VPN tunnel, once the USB VPN device 300 is plugged into the USB port 304 of the client computer 301 (see FIGS. 3-5).

In step a), the signal 303 boots/powers up the VPN operating system (OS).

In step b), when fully powered up, the connection indicator 310 on the USB VPN device 300, if present, will display red to indicate it is ready for authentication.

In step c), at this point, the user can start the authentication applet which is preinstalled on the smartphone 302.

In step d) the smartphone 302 will present an authentication request, and after the user enters the required password into the application, the smartphone 302 will transmit an encrypted signal to the USB VPN device 300, which will return an authentication token to the smart phone 302.

In step e), once a valid authentication token is received from the USB VPN device 300, and if the system is configured for remote authentication, the token will be forwarded by the smartphone 302 to the authentication server 305 for authorization.

In step f), once authorized by the authentication server 305, the smart phone application will transmit an encrypted signal to the USB VPN device 300, with authorization to connect the VPN tunnel 309. At this point the connection indicator 310 on the USB VPN device 300, if present, will display green. If the system is not configured for remote authentication, the application on the smartphone 302 will validate the token.

In step g), once the authentication information is validated as in steps 3) and 4) above, the VPN tunnel 309—via VPN server 306—can be activated from client computer 301 to remote computers, i.e., servers 307, 308. The VPN tunnel 309 will stay activated as long as the smartphone 302 is sending the signal to the USB VPN device 300, and is within a predetermined range (to prevent deterioration of signal strength) from the client computer 301. This continuous, proximity authentication, is another feature of the present invention.

The predetermined range for the proximity of the smart phone 302 can be determined using Received Signal Strength Indication (RSSI) with Bluetooth LE, or the limited range of NFC. Once the smartphone 302 is out of range of the USB VPN device 300, the RSSI Bluetooth LE or limited range of NFC, the VPN tunnel 309 will be terminated.

In one embodiment, all data transmitted from the smartphone 302 to the USB VPN device 300 will be encrypted using asymmetric cryptography with the private key stored on the USB VPN device 300. Public key will be stored on the smartphone 302. Data transmitted from the USB VPN device 300 to the smartphone 302 will be symmetric-key block cipher with random keys received from the last transmission from the smartphone 302. The private keys and activation tokens will be generated during the administration process using the onboard web service and stored securely in the memory in the microprocessor of the USB VPN device 300. In order to upload the operating system from the USB VPN device 302 into the client computer 301, and implement imaging and configuration thereof, the web service is deactivated.

In one embodiment, and as noted above, the USB VPN device 300 will use onboard intrusion detection to protect the VPN tunnel system of the present invention, from unauthorized access. Once an unauthorized attempt is detected by the operating system software program of the VPN tunnel system of the present invention, the VPN tunnel system will delete all secured data in microprocessor memory storage on the USB VPN device 300, and deactivate the USB VPN device 300.

In one embodiment, as noted above, the USB VPN device 300 runs its software program on its own microprocessor and operating system, which removes the requirement of installing the VPN software, certificates and passwords on the client machine 301.

In another embodiment consistent with the present invention, the USB VPN device 300 can be equipped with an optical sensor to read Quick Response (QR) codes for authentication in wireless blackout scenarios.

In this embodiment, the steps i)-iii), are the same as steps a)-c) above.

In step iv), the smartphone 302 will present an authentication request, and after the user enters the required password into the application, the smartphone 302 will retrieve or generate a QR Code from the authentication server 305, or use one retrieved from the smartphone 302 cache. Once a valid authentication QR code is received by the smartphone 302, and if the VPN tunnel system of the present invention is configured for remote authentication, the token will be forwarded to the authentication server 305 for authorization.

Steps v) and vi) are the same as steps f) and g) above.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A virtual private network (VPN) tunnel system comprises:

a controller disposed in a universal serial bus (USB) VPN device, said controller which is coupled to a client computer, said controller including a microprocessor containing at least one memory, said memory containing an operating system program;

wherein said memory stores authentication information including certificate, password and endpoint information only in said controller instead of in a database of said client computer;

wherein when authentication information from said client computer is validated by said controller, said microprocessor executes said operating system program of said controller to implement at least one VPN tunnel, from said USB VPN device through the client computer, which connects said client computer to a VPN server and to a private network of computers and servers, via an internet connection; and wherein said operating system program to implement said at least one VPN tunnel is stored and executed only from said microprocessor of said USB VPN device, and wherein other than driver and routing information, no other software program is installed on said client computer from said USB VPN device.

2. The system of claim 1, wherein primary and continuous authentication of said controller is performed by at least one of periodic input of biometrics of a user, or communications with a secondary device via at least one contactless communication system.

3. The system of claim 2, wherein said contactless communication system includes one of Bluetooth Low Energy (LE), Near-Field Communication (NFC), or Quick Response (QR) Code.

4. The system of claim 3, wherein said secondary device includes one of a portable or wearable device, including one of a smartphone, a smartwatch, an NFC ring, or a custom device with a microprocessor.

5. The system of claim 4, wherein said secondary device is equipped with wireless capability;

wherein said secondary device emits a signal to said controller using said wireless capability, in order to activate said VPN tunnel once said controller is coupled to said client computer.

6. The system of claim 5, wherein an authentication applet is preinstalled on said secondary device; and wherein a password is received in said secondary device upon an authentication request, and said signal is transmitted to said controller, which returns an authentication token to said secondary device; and wherein once said authentication token is received from said controller and is valid, and when said operating system program is configured for remote authentication, said authentication token is forwarded by said secondary device to an authentication server for authorization.

7. The system of claim 5, wherein said VPN tunnel remains activated for as long as said secondary device is sending said signal to said controller, and said secondary device is within a predetermined range from said client computer; and wherein when said secondary device is out of range of said controller, said VPN tunnel is terminated.

8. The system of claim 7, wherein said predetermined range is determined using Received Signal Strength Indication (RSSI) with one of Bluetooth LE, or a limited range of NFC.

9. The system of claim 3, wherein said USB VPN device further comprises an optical sensor to read Quick Response (QR) codes for authentication.

10. The system of claim 2, wherein said VPN tunnel is deactivated immediately when one of inactivity over a predetermined period of time occurs at said client computer, incorrect biometrics are received at said client computer, uncoupling of said controller from said client computer occurs, or lack of proximity of said secondary device from said client computer occurs.

11. The system of claim 2, wherein said controller automatically deactivates upon intrusion detection and deletes all secured data in said memory.

12. The system of claim 11, wherein said deactivation of said VPN tunnel after said inactivity does not result in destruction of said USB VPN device.

13. The system of claim 1, wherein said memory stores encryption private keys.

14. The system of claim 1, further comprising:
a status indicator disposed on said USB VPN device, which indicates at least one of a connected status or a security status of said USB VPN device.

15. The system of claim 1, wherein said controller automatically deactivates an onboard webserver protocol upon completion of configuration of said USB VPN device.

16. The method of claim 1, wherein said controller automatically deactivates an onboard webserver protocol upon completion of configuration of said USB VPN device.

17. A method of implementing a virtual private network (VPN) tunnel system, comprising:
coupling a controller to a client computer;, said controller which is disposed in a universal serial bus (USB) VPN device;

wherein said controller includes a microprocessor containing at least one memory which contains an operating system program;

wherein said memory stores certificate, password and endpoint information only in said controller instead of in a database of said client computer; and receiving authentication information from said client computer;

validating said authentication information using said controller; and executing said operating system program of said controller to implement at least one VPN tunnel, from said USB VPN device through the client computer, which connects said client computer to a VPN server and to a private network of computers and servers, via an internet connection;

wherein said operating system program to implement said at least one VPN tunnel is stored and executed only from said microprocessor of said USB VPN device; and wherein other than driver and routing information, no other software program is installed on said client computer, from said USB VPN device.

18. The method of claim 17, further comprising:
performing primary and continuous authentication of said controller is performed by at least one of periodic input of biometrics of a user, or communications with a secondary device via at least one contactless communication system.

19. The method of claim 18, wherein said contactless communication system includes one of Bluetooth Low Energy (LE), Near-Field Communication (NFC), or Quick Response (QR) Code.

20. The method of claim 19, further comprising:
deactivating said controller automatically upon intrusion detection and deleting all secured data in said memory.

21. The method of claim 20, wherein said deactivation of said VPN tunnel after said inactivity does not result in destruction of said USB VPN device.

22. The method of claim 19, further comprising:
indicating at least one of a connected status or a security status of said USB VPN device using a status indicator disposed on said USB VPN device.

23. The method of claim 19, wherein said USB VPN device further comprises an optical sensor to read Quick Response (QR) codes for authentication.

24. The method of claim 18, further comprising:
deactivating said VPN tunnel immediately when one of inactivity over a period of time occurs at said client computer, incorrect biometrics are received at said client computer, uncoupling of said controller from said client computer occurs, or lack of proximity of said secondary device from said client computer occurs.

25. The method of claim 18, wherein said secondary device includes one of a portable or wearable device, including one of a smartphone, a smartwatch, an NFC ring, or a custom device with a microprocessor.

26. The method of claim 18, further comprising:
emitting a signal to said controller using wireless capability of said secondary device, in order to activate said VPN tunnel once said controller is coupled to said client computer.

27. The method of claim 26, further comprising:
preinstalling an authentication applet on said secondary device; and
receiving a password in said secondary device upon an authentication request, and transmitting said signal to said controller;
returning an authentication token to said secondary device;
validating said authentication token; and
forwarding said authentication token to an authentication server for authorization when said operating system program is configured for remote authentication.

28. The method of claim 26, wherein said VPN tunnel remains activated for as long as said secondary device is sending said signal to said controller, and said secondary device is within a predetermined range from said client computer; and
wherein when said secondary device is out of range of said controller, said VPN tunnel is terminated.

29. The method of claim 28, wherein said predetermined range is determined using Received Signal Strength Indication (RSSI) with one of Bluetooth LE, or a limited range of NFC.

30. The method of claim 17, wherein said memory stores encryption private keys.

* * * * *